United States Patent [19]
Hoon, Jr.

[11] 3,832,832
[45] Sept. 3, 1974

[54] METHOD AND APPARATUS FOR CLEANING THE FILTER ELEMENTS OF A DUST COLLECTOR

[75] Inventor: Harry E. Hoon, Jr., Strongsville, Ohio

[73] Assignee: Envirotech Corporation, Salt Lake City, Utah

[22] Filed: June 12, 1972

[21] Appl. No.: 262,042

[52] U.S. Cl. .................. 55/302, 55/341, 251/133
[51] Int. Cl. .............................................. B01d 46/04
[58] Field of Search .................. 55/96, 271–273, 55/283, 288, 293, 302–303, 341; 210/333; 251/133, 138

[56] References Cited
UNITED STATES PATENTS

| 777,372 | 12/1904 | Howard | 251/133 |
| 3,057,139 | 10/1962 | Perlis et al. | 55/303 |
| 3,594,991 | 7/1971 | Berz et al. | 55/302 |
| 3,720,295 | 3/1973 | Balz | 251/134 |

Primary Examiner—Bernard Nozick
Attorney, Agent, or Firm—Robert E. Krebs; Thomas S. MacDonald

[57] ABSTRACT

A method and apparatus for cleaning a fabric tubular type filter element in a dust collector by imparting a momentary pneumatic pulse to the filter element at predetermined intervals. The pulse is imparted to the filter by reversing the direction of the air flow through it and immediately thereafter restoring normal flow of air through the filter element, all within a period of a fraction of a second. The apparatus includes a high speed electric motor having an extension on its shaft which is directly coupled to a valve member through a screw and nut coupling. The valve member is movable in a direction extending axially of the motor axis and is disposed between two aligned but spaced apart valve seats, one of which is in communication with a source of less-than-air pressure and the other of which is in communication with the atmosphere. As the valve moves from one seat to the other, communication between the filter element and the source of less-than-air pressure is shut off and simultaneously the filter element is in communication with the atmosphere. The motor is reversed as soon as the valve shuts off the source of less-than-air pressure and the valve seat is immediately returned to its original position, where it shuts off communication between the filter element and the atmosphere. The motor is actuated at cyclic intervals by any one of various forms of timing or pressure responsive devices.

1 Claim, 4 Drawing Figures

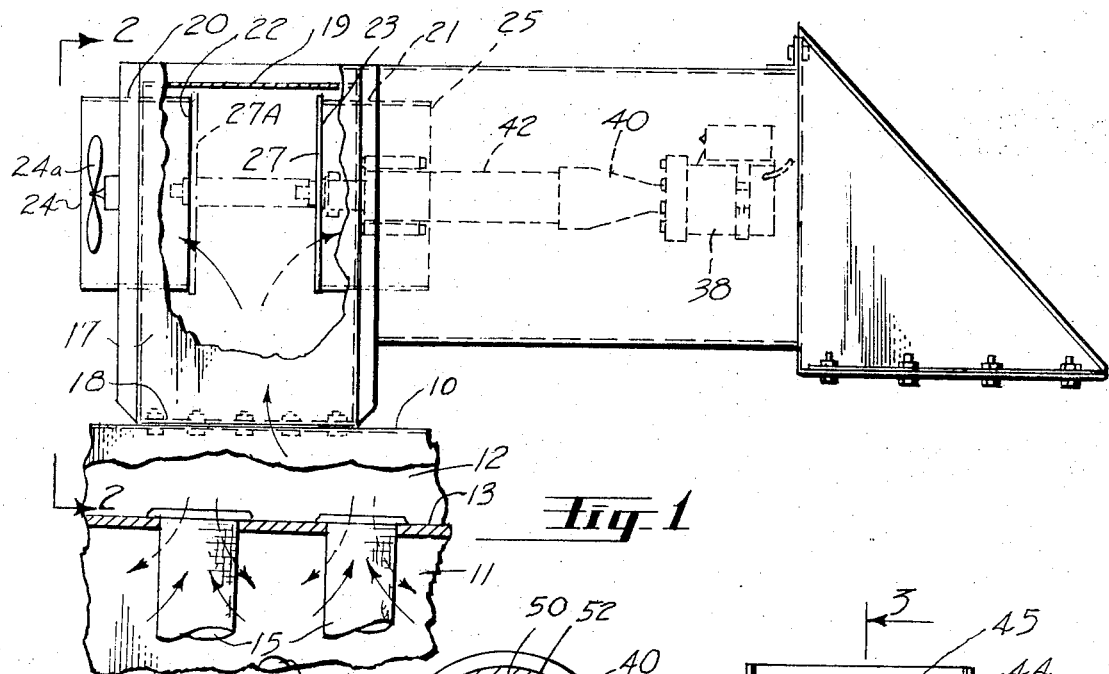
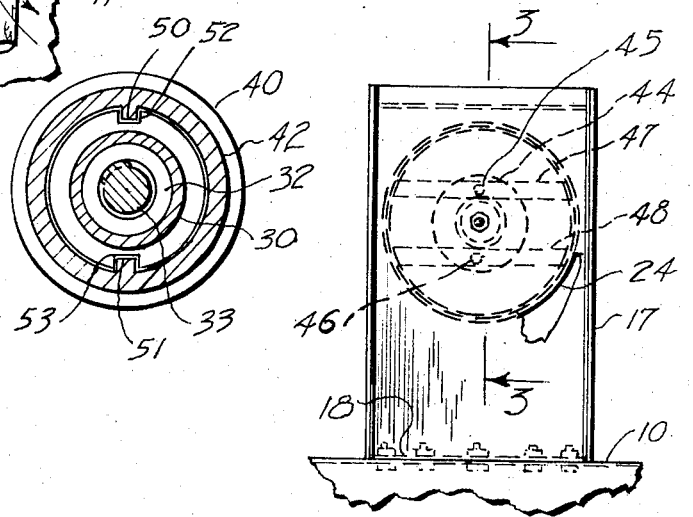
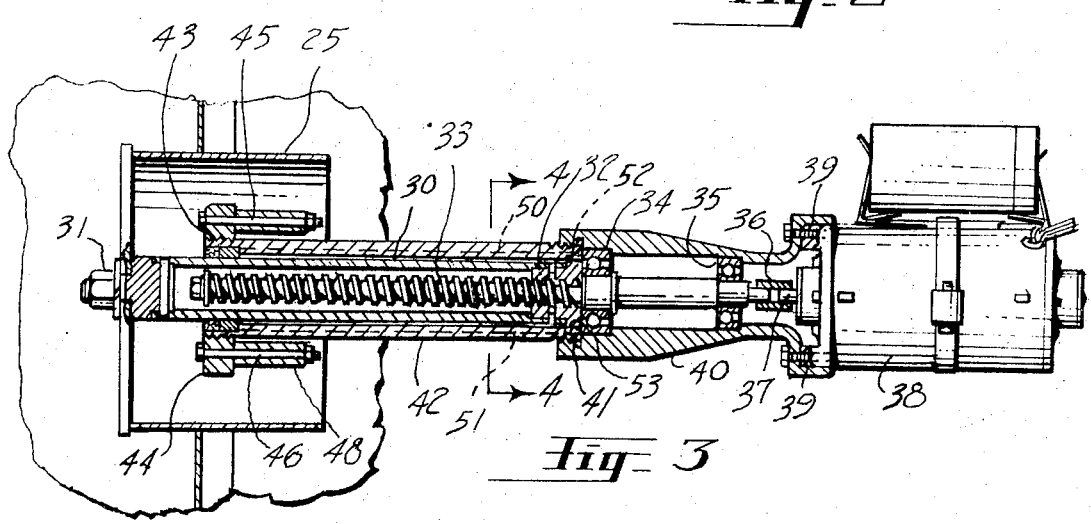

3,832,832

METHOD AND APPARATUS FOR CLEANING THE FILTER ELEMENTS OF A DUST COLLECTOR

BACKGROUND OF THE INVENTION

Heretofore fabric tubular type filter elements have been cleaned by reversing the direction of air flow through them and one such device has included a valve member which is disposed within a clean air exhaust conduit and is movable between two aligned openings in such conduit, one of which is in communication with a source of less-than-air pressure, and the other of which is in communication with the atmosphere. In such prior installations the valve member has been moved by compressed air with suitable controls for actuating the valve at cyclic intervals, but the difficulty of operation with compressed air is that a source for compressed air must be maintained at the dust collector which normally is outside the plant and at a remote distance therefrom, where a source of compressed air is not readily available.

Further, difficulty has been that the use of compressed air has necessitated extensive piping arrangements for all of the valves which increases progressively as the number of compartments in the dust collector increases. At present, dust collectors have as many as forty compartments each of which must be cleaned at a predetermined interval. A further objection to the use of compressed air as a motive power for actuating the valve is the slowness with which the valve can be operated. Thus, as the valve member moves from one seat to the other, the conduit within which it is mounted is opened simultaneously to the source of less-than-air pressure and to the atmosphere. Such action occurs not only as the valve is moving from the atmospheric seat to the less-than-air pressure seat, but also while the valve is moving back to its original position.

SUMMARY OF THE INVENTION

The present invention includes a method and apparatus for cleaning a fabric tubular type filter element of a dust collector by imparting a momentary pneumatic pulse to the filter element in a much shorter period of time than has heretofore been utilized. This has been accomplished by mounting a valve member within a clean air discharge conduit for movement between two openings in the conduit, one of which is in communication with a source of less-than-air pressure, and the other of which is in communication with the atmosphere. The present invention then provides apparatus for moving the valve member from one seat to the other and back to the original position by mounting the valve member upon an extension of the shaft of an electric motor and by utilizing a screw and nut coupling between the shaft and the valve member so as to impart a straight line motion to the valve member from one seat to the other. By utilizing a high speed electric motor of the order of 3,000 rpm, the valve member can be moved from one seat to the other and back again in a fraction of a second. This does not allow enough time for any substantial lowering of the pressure of the source of less-than-air pressure, as a result of which the valve is operated at a high degree of efficiency.

A further advantage of the present invention is that the need for compressed air motors with the attendant source of compressed air supply and complex piping arrangement for all of the valves is eliminated. Additionally, the elimination of the use of compressed air prevents freezing of the equipment in cold climates and obviates the necessity for a source of compressed air at locations remote from the main plant of the user.

BRIEF DESCRIPTION OF THE DRAWINGS

FIG. 1 is a side elevation partly in section showing a portion of one compartment of a dust collector which is equipped with apparatus for carrying out the method of the present invention;

FIG. 2 is an end elevation as viewed from the direction indicated by the line 2—2 in FIG. 1;

FIG. 3 is a vertical section taken on a plane indicated by the line 3—3 in FIG. 2; and FIG. 4 is a vertical section taken on a plane indicated by the line 4—4 in FIG. 3.

DESCRIPTION OF THE PREFERRED EMBODIMENT

In FIG. 1, 10 indicates the housing of a dust collector having dust compartments, one of which is indicated at 11 having an inlet 11a and an associated clean air compartment, one of which is indicated at 12. A partition or wall 13 divides the two compartments and has openings therein for receiving fabric tubular type filter elements 15 which are suspended from the wall 13 and extend downwardly into the dust compartment 11.

Clean air is withdrawn from each compartment 12 into a conduit 17 through an opening 18 in a wall of the housing 10. The top of the conduit 17 is closed by a wall 19, and the conduit is provided with opposed openings 20 and 21 which are adapted to be in communication with a source such as suction fan 24a of less-than-air pressure and with the atmosphere, respectively. Each opening has a valve seat associated with it and for convenience the valve seats comprise the inner end walls 22 and 23 of thimbles 24 and 25 respectively. The thimble 24 is fitted tightly within the opening 20 while the thimble 25 is fitted tightly within the opening 21 and both are secured, as by welding, to the conduit 17.

A valve member in the form of a disk 27 is positioned within the conduit between the valve seats 22 and 23, and provision is made for moving the disk from the solid line position shown in FIG. 1 to the dotted line position 27a in FIG. 1. When the valve member is in engagement with the seat 23, the conduit 17 is in communication only with the source of less-than-air pressure, but whenever the valve is in engagement with the seat 22, the conduit is in communication only with the atmosphere.

To support the valve member 27, reference is made to FIG. 3 which shows a tubular stem 30 which is attached at 31 to the central portion of the disk. The opposite end of the stem carries a nut 32 which is in threaded engagement with a screw shaft 33, the latter of which is journalled in bearings 34 and 35 and is coupled, as at 36, to a motor shaft 37. The motor is indicated at 38 as being attached at 39 to a housing 40, the latter of which supports the bearings 34 and 35. The housing 40, in turn, is rigidly connected at 41 to a tube 42 which is rigidly connected, as at 43, to a collar 44. The collar may be rigidly supported within the thimble 25 by bolts 45 and 46 which fasten it to spaced arms 47 and 48 (FIGS. 2 and 3) respectively, which are welded to the thimble. The tube 42 has diametrically opposed axially extending keys 50 and 51 which extend into diametrically opposed keyways 52 and 53 respectively on the head 54 of the nut 32.

The foregoing motor and valve assembly causes the valve member 27 to move in a straight line direction from one valve seat to the other. Thus, whenever the motor is operated in a direction to cause the nut 32 to move to the left in FIG. 1, the valve member 27 is moved from the full line position to the dotted line position 27A of FIG. 1. A limit switch (not shown) operates to reverse the motor and to retract the valve member to the original position as soon as the valve member reaches the valve seat 22. The motor has an operating speed of about 3,000 RPM, and the drive screw 33 has a pitch which will accomplish a drive speed of about 24 inches per second. The distance between the valve seats 22 and 23 is about 6 inches, hence, the valve member is moved from one seat to the other in about 1/4 of a second. Thus, the opening of the conduit 17 to the atmosphere and the accompanying closure of communication between the conduit 17 and the source of less-than-air pressure occurs almost simultaneously, yet with sufficient lapse of time to allow the air under atmosphereic pressure to enter the conduit 17 and also the tubular filter elements 15, and thereby to impart a sudden pulse to the elements which is sufficient to dislodge accumulated dust on the elements in an effective and efficient manner.

Any suitable timer (not shown) may be used for initiating the operation of each motor 38 for the respective filter compartments. Thus, a clock-timer or a solid state timer could be set for actuating each compartment motor at predetermined intervals of time, or a timer which is responsive to the pneumatic pressure differential between the dust compartment and the clean air compartment could be utilized for actuating each motor at predetermined pressure differentials. Such timers are presently available for use in cleaning the filter elements of existing dust collectors.

I claim:

1. A bag-type filtration device for removing particulates from a gaseous stream comprising:
   a. a sealed housing having an inlet for the gaseous stream and a plurality of outlet apertures formed in said housing through which cleaned gases are discharged;
   b. a plurality of bag-shaped filtering elements which are tautly disposed and arranged in the housing with the mouths of said bags being fixed into said outlet apertures so that the gases from the inlet gaseous stream pass inward through the walls of the bags while particulates are collected on the exteriors of said bags;
   c. a conduit which is in gaseous-flow communication with said outlet apertures and which extends exteriorly to said housing, said conduit having a closed end and a pair of aligned opposed openings formed through its walls adjacent said closed end, one of said openings of said pair being open to the atmosphere;
   d. means for inducing a gaseous flow at less-than-atmosphereic air pressure, said flow-inducing means being connected in gaseous-flow communication with the other opening of said pair;
   e. a valve member arranged within said conduit and mounted on a shaft stem for selective movement from one side to the other of said conduit between said pair of openings, said valve member having opposite surfaces defining faces which are adapted for alternatively closing respective ones of said openings of said pair;
   f. linearly extensible reversible electric motor means including a motor shaft connected to said valve member by means including said shaft stem for selectively reciprocally moving said valve across said conduit, thereby to place the interiors of said filtering elements alternatively in communication with the atmosphere and with said flow inducing means.

* * * * *